United States Patent
Ohkawa et al.

(10) Patent No.: US 7,582,579 B2
(45) Date of Patent: Sep. 1, 2009

(54) PHOSPHATE OPTICAL GLASS

(75) Inventors: Hiroyuki Ohkawa, Tokyo (JP); Naoki Sugimoto, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/110,502

(22) Filed: Apr. 28, 2008

(65) Prior Publication Data

US 2008/0207427 A1    Aug. 28, 2008

Related U.S. Application Data

(63) Continuation of application No. PCT/JP2006/32117, filed on Oct. 24, 2006.

(30) Foreign Application Priority Data

Oct. 26, 2005 (JP) .............................. 2005-311293

(51) Int. Cl.
    C03C 3/17   (2006.01)
    C03C 3/19   (2006.01)
    C03C 3/21   (2006.01)
    C03C 3/062  (2006.01)

(52) U.S. Cl. .............................. 501/48; 501/46; 501/47

(58) Field of Classification Search ................ 501/45, 501/46, 47, 48, 73, 77, 78, 79
See application file for complete search history.

(56) References Cited

U.S. PATENT DOCUMENTS 5,173,456 A * 12/1992 Hayden et al. ................ 501/45

5,607,886 A * 3/1997 Onozawa ..................... 501/73
2005/0143250 A1* 6/2005 Fujiwara et al. ............... 501/48

FOREIGN PATENT DOCUMENTS

| JP | 57-118045   | 7/1982   |
| JP | 2-188442    | 7/1990   |
| JP | 7-315860    | 12/1995  |
| JP | 10-158027   | 6/1998   |
| JP | 10-316647   | 12/1998  |
| JP | 2003-238197 | 8/2003   |
| SU | 477948      | * 8/1975 |

OTHER PUBLICATIONS

U.S. Appl. No. 12/273,574, filed Nov. 19, 2008, Imakita, et al.
U.S. Appl. No. 12/332,589, filed Dec. 11, 2008, Sasai, et al.
U.S. Appl. No. 12/195,496, filed Aug. 21, 2008, Ohkawa, et al.

* cited by examiner

*Primary Examiner*—Karl E Group
(74) *Attorney, Agent, or Firm*—Oblon, Spivak, McClelland, Maier & Neustadt, P.C.

(57) ABSTRACT

The object of the present invention is to provide an optical glass which has optical constants such as a refractive index of from 1.45 to 1.65 and an Abbe number of at least 65 and which is yet excellent in chemical durability. A phosphate optical glass comprising, as glass components by mass %, from 73 to 85 of $P_2O_5$, from 14 to 26 of $Al_2O_3$, from 1 to 12 of $K_2O+Li_2O$, from 0 to 12 of $SiO_2$, from 0 to 12 of $B_2O_3$, from 0 to 12 of $Na_2O$, from 0 to 12 of $Y_2O_3$, from 0 to 12 of $La_2O_3$, from 0 to 12 of $MgO+CaO+SrO+BaO$, from 0 to 10 of $ZrO_2+TiO_2+Gd_2O_3$, from 0 to 10 of $Ta_2O_5+GeO_2+Ga_2O_3+Nb_2O_5+WO_3+TeO_2$, from 0 to 2 of $Sb_2O_3$, and from 0 to 12 of $ZnO+PbO$.

5 Claims, No Drawings

PHOSPHATE OPTICAL GLASS

TECHNICAL FIELD

The present invention relates to a phosphate optical glass which is precision press moldable and which is excellent particularly in chemical durability.

BACKGROUND ART

Heretofore, as an optical glass having high dispersibility, a phosphate optical glass containing $P_2O_5$ as the basic component has been known. However, the conventional phosphate optical glass has had a problem that it is poor in durability, particularly in chemical durability, and in a polishing step or washing step of the optical glass or during its use as a lens for a long period of time, weathering and erosion are likely to occur on its surface. Especially in the case of an optical glass to be subjected to precision press molding, the question of chemical durability becomes important, since it contains alkali metal/alkaline earth metal elements so that it can be easily molded.

As a proposal to improve the chemical durability of such phosphate optical glass, a composition containing a specific amount of $Al_2O_3$ has been proposed in Patent Document 1, but it is still not satisfactory from the point of chemical durability. Further, as a phosphate optical glass for precision press molding, a composition is disclosed also in e.g. Patent Document 2, but it is to cover a low dispersibility range of an Abbe number being from 23 to 42 and is not one to cover a high dispersibility range of an Abbe number being at least 65.

Patent Document 1: JP-A-57-118045 (detailed description of the invention)

Patent Document 2: JP-A-2003-238197 (detailed description of the invention)

DISCLOSURE OF THE INVENTION

Object to be Accomplished by the Invention

It is an object of the present invention to provide an optical glass which has optical constants such as a refractive index of from 1.45 to 1.65 and an Abbe number of at least 65 and which is yet excellent in chemical durability.

Means to Accomplish the Object

The present inventors have conducted an extensive research to accomplish the above object and as a result have arrived at the present invention. Namely, the present invention provides the following:

(1) A phosphate optical glass comprising, as glass components by mass %, from 73 to 85 of $P_2O_5$, from 14 to 26 of $Al_2O_3$, from 1 to 12 of $K_2O+Li_2O$, from 0 to 12 of $SiO_2$, from 0 to 12 of $B_2O_3$, from 0 to 12 of $Na_2O$, from 0 to 12 of $Y_2O_3$, from 0 to 12 of $La_2O_3$, from 0 to 12 of $MgO+CaO+SrO+BaO$, from 0 to 10 of $ZrO_2+TiO_2+Gd_2O_3$, from 0 to 10 of $Ta_2O_5+GeO_2+Ga_2O_3+Nb_2O_5+WO_3+TeO_2$, from 0 to 2 of $Sb_2O_3$, and from 0 to 12 of $ZnO+PbO$.

(2) The phosphate glass according to the above (1), which comprises, as glass components by mass %, from 74 to 80 of $P_2O_5$, from 15 to 25 of $Al_2O_3$ and from 1 to 8 of $K_2O+Li_2O$.

(3) The phosphate glass according to the above (1) or (2), which contains from 1 to 4 mass % of $Li_2O$.

(4) The phosphate glass according to any one of the above (1) to (3), which has a refractive index ($n_d$) of from 1.45 to 1.65 and an Abbe number ($v_d$) of from 65 to 80.

(5) The phosphate glass according to any one of the above (1) to (4), which has a glass transition point (Tg) of at most 600° C.

Effects of the Invention

The phosphate optical glass of the present invention has optical constants such as a refractive index being from 1.45 to 1.65 and an Abbe number being at least 65 and yet is excellent in chemical durability, which has not been accomplished by a conventional product.

Further, it is an optical glass which is readily meltable and scarcely devitrified and has a low glass transition point, thus being suitable for press molding. Further, it does not require expensive $Ga_2O_3$, $GeO_2$ and $Ta_2O_5$ components as essential components, and thus, it is an optical glass advantageous also from the aspect of raw material costs.

BEST MODE FOR CARRYING OUT THE INVENTION

The phosphate optical glass of the present invention (hereinafter referred to as the present glass) is characterized in that it comprises at least (1) $P_2O_5$, (2) $Al_2O_3$ and (3) $Li_2O$ and/or $K_2O$. In this specification, "%" means "mass %" unless otherwise specified.

In the present glass, $P_2O_5$ is the main component to constitute the optical glass (the glass-constituting oxide) and contained in an amount of from 73 to 85%. If $P_2O_5$ is less than 73%, the desired optical constants tend to be hardly obtainable. On the other hand, if $P_2O_5$ exceeds 85%, the chemical durability tends to deteriorate. With respect to the upper limit, $P_2O_5$ is preferably at most 80%, more preferably at most 78%. In the present glass, $P_2O_5$ is preferably at least 74%, whereby the balance of the optical constants and the chemical durability will be good. More preferably, $P_2O_5$ is at least 75%, and particularly preferably, $P_2O_5$ is at least 76%.

In the present glass, $Al_2O_3$ is an essential component from the viewpoint of the chemical durability and is contained in an amount of from 14 to 26%. If $Al_2O_3$ is less than 14%, no adequate chemical durability tends to be obtainable. On the other hand, if $Al_2O_3$ exceeds 26%, the melting property tends to be low, and the desired optical constants may not be obtainable. In the present glass, with respect to the lower limit, $Al_2O_3$ is preferably at least 15%, and more preferably $Al_2O_3$ is at least 16%. Likewise, in the present glass, with respect to the upper limit, $Al_2O_3$ is preferably at most 25%, more preferably at most 23%.

In the present glass, $Li_2O$ and/or $K_2O$ is an essential component to lower the glass transition temperature to a temperature suitable for press molding and is contained in an amount of from 1 to 12%, preferably from 1 to 8%. If $Li_2O$ and/or $K_2O$ is less than 1%, the glass transition temperature tends to be high, and the press moldability tends to be low. On the other hand, if $Li_2O$ and/or $K_2O$ exceeds 12%, the chemical durability tends to deteriorate, and the desired optical constants may not be obtainable. In the present glass, $Li_2O$ is preferably contained in an amount of from 1 to 4% with a view to improvement of the low temperature moldability and the chemical durability. In the present glass, in a case where $Li_2O$ is not contained and only $K_2O$ is contained, $K_2O$ is preferably contained in an amount of from 1 to 6% with a view to improvement of the low temperature moldability and the chemical durability.

In the present glass, a part of $Li_2O$ and/or $K_2O$ may be replaced by $Na_2O$. However, if the amount of $Na_2O$ becomes large, the chemical durability will decrease. Accordingly, the $Na_2O$ content is preferably lower as far as possible.

In the present glass, $SiO_2$ is not an essential component, but is effective for improving the chemical durability while the low dispersibility (a high Abbe number) is maintained. However, if the amount is large, the desired optical characteristics tend to be hardly obtainable, and at the same time, the glass transition temperature tends to increase, and consequently, the molding temperature during the press molding tends to increase, and the productivity, etc. tend to deteriorate. Accordingly, in the present glass, $SiO_2$ is added preferably from 0 to 12%, more preferably from 0 to 7%. In the present glass, when $SiO_2$ is added, the lower limit is preferably at least 1%, more preferably at least 3%, particularly preferably at least 5%.

In the present glass, $B_2O_3$ is not an essential component, but is effective for maintaining the low dispersibility. On the other hand, if the amount becomes large, the desired optical characteristics tend to be hardly obtainable. Accordingly, when $B_2O_3$ is added, it is preferably from 0 to 12%, more preferably from 0 to 9%, particularly preferably from 0 to 6%. In the present glass, when $B_2O_3$ is added, the lower limit is preferably at least 2%, more preferably at least 3%, particularly preferably at least 4%.

In the present glass, $Y_2O_3$ is not an essential component, but it is capable of increasing the refractive index while maintaining the low dispersibility, and it is further effective for improving the chemical durability. However, if the amount is too large, the melting temperature rises, and the melting property decreases. Accordingly, when $Y_2O_3$ is added, it is preferably from 0 to 12%, more preferably from 0 to 7%. In the present glass, when $Y_2O_3$ is added, the lower limit is preferably at least 2%, more preferably at least 4%, particularly preferably at least 6%.

In the present invention, $La_2O_3$ has the same effects as $Y_2O_3$. Accordingly, when $La_2O_3$ is added, it is preferably from 0 to 12%, more preferably from 0 to 7%. In the present glass, when $La_2O_3$ is added, the lower limit is preferably at least 2%, more preferably at least 4%, particularly preferably at least 6%.

In the present glass, at least one member of MgO, CaO, SrO and BaO is not an essential component, but if it is added, the refractive index can be improved. However, if the amount is too large, the desired optical constants tend to be hardly obtainable. Accordingly, the amount to be added in the present invention is preferably from 0 to 12%, more preferably from 0 to 11%, and its amount is particularly preferably from 0 to 8%. In the present glass, when at least one member of MgO, CaO, SrO and BaO is added, the lower limit is preferably at least 1%, more preferably at least 2%, particularly preferably at least 3%.

In the present glass, at least one member selected from the group consisting of $ZrO_2$, $TiO_2$ and $Gd_2O_3$ is not an essential component, but if it is added, the chemical durability or the devitrification resistance can be improved. On the other hand, if the amount is too large, the Abbe number will decrease. Accordingly, the amount is preferably from 0 to 10%, more preferably from 0 to 5%. In the present glass, when at least one member of $ZrO_2$, $TiO_2$ and $Gd_2O_3$ is added, the lower limit is preferably at least 1%, more preferably at least 2%, particularly preferably at least 3%.

In the present glass, at least one member selected from the group consisting of $Ta_2O_5$, $GeO_2$, $Ga_2O_3$, $Nb_2O_5$, $TeO_2$ and $WO_3$, is not an essential component, but when it is added, the refractive index will increase. However, if the amount is too large, the Abbe number will decrease. Accordingly, the amount is preferably from 0 to 10%, more preferably from 0 to 5%. Further, raw materials for such components are expensive. Accordingly, if the material costs are important, it is preferred to minimize their amount. In the present glass, when at least one member selected from the group consisting of $Ta_2O_5$, $GeO_2$, $Ga_2O_3$, $Nb_2O_5$, $TeO_2$ and $WO_3$ is added, the lower limit is preferably at least 1%, more preferably at least 2%, particularly preferably at least 3%.

In the present glass, $Sb_2O_3$ is not an essential component, but may be added as a fining agent at the time of melting the glass. Its amount is preferably at most 2%, more preferably at most 1%. In the present glass, when $Sb_2O_3$ is added, the lower limit is preferably at least 0.01%, more preferably at least 0.1%, particularly preferably at least 0.2%.

In the present glass, addition of ZnO and/or PbO is effective to lower the melting temperature. The amount of ZnO and/or Pbo is preferably from 0 to 12%, more preferably from 0 to 7%. However, when the influence to the environment, etc. are taken into consideration, it is preferred not to substantially contain them. In the present glass, when ZnO and/or PbO is added, the lower limit is preferably at least 1%, more preferably at least 3%, particularly preferably at least 5%.

Further, in the present glass, each element of Ag, Cu or Fe is preferably not substantially contained, since its ions will cause coloration.

As an optical characteristic of the present glass, the refractive index $(n_d)$ is preferably from 1.45 to 1.65. The refractive index $(n_d)$ is further preferably at least 1.50, and particularly preferably, the refractive index $(n_d)$ is at least 1.53. The Abbe number $(v_d)$ of the present glass is preferably from 65 to 80. The Abbe number $(v_d)$ is more preferably at least 67, and particularly preferably, the Abbe number $(v_d)$ is at least 70. The glass transition point (Tg) of the present glass is preferably at most 600° C., and more preferably, the glass transition point is at most 550° C. Namely, as optical characteristics of the present glass, the refractive index $(n_d)$ is from 1.45 to 1.65, preferably from 1.50 to 1.55, and the Abbe number $(v_d)$ is from 65 to 80, preferably from 68 to 72.

The process for producing the present glass is not particularly limited, and it may be produced, for example, by weighing and mixing raw materials to be used for a usual optical glass, such as oxides, hydroxides, carbonates, nitrates, etc., putting them into a platinum crucible, melting them at a temperature of from about 1,200 to 1,300° C. for from 2 to 6 hours, followed by fining and stirring, and then casting the melt into a mold preheated to about 500° C., followed by annealing.

EXAMPLES

Now, the present invention will be described in further detail with reference to Examples, etc. However, it should be understood that the present invention is by no means restricted to the following Examples. Here, Examples 1 to 3 are Comparative Examples to the present invention, and Examples 4 to 13 are working Examples of the present invention.

Chemical Compositions/Sample Preparation Method

Raw materials were weighed to bring the chemical compositions (%) as shown in Tables 1 and 2. With respect to raw materials for each glass, $H_3PO_4$ was used for $P_2O_5$, $KNO_3$ was used for $K_2O$, $Li_2CO_3$ was used for $Li_2O$, $CaCO_3$ was used for CaO, $H_3BO_3$ was used for $B_2O_3$, and an oxide was used for $Al_2O_3$. The weighed raw materials were dry-mixed for 30 minutes by a mixer, put into a platinum crucible having an internal capacity of about 300 cm³ and melted at 1,200° C. to 1,300° C. for from 2 to 6 hours, followed by fining and stirring and then, casted into a rectangular mold of 15 mm×50 mm preheated to about 500° C. and then annealed at a rate of about 1° C./min to obtain a sample.

Evaluation Method

The refractive index ($n_d$) was obtained as a refractive index to helium d-line, and the Abbe number ($v_d$) was obtained from $v_d=(n_d-1)/(n_F-n_C)$, wherein $n_F$ and $n_C$ were refractive indices to hydrogen F-line and hydrogen C-line, respectively. Here, the refractive index was measured by a refractometer (trade name: KRP-2, manufactured by Kalnew optical Industrial Co., Ltd.). The glass transition point (Tg) was measured by subjecting each glass powder obtained, to a differential thermal analysis (DTA) by means of a thermal analyzer (trade name: EXSTAR6000TG/DTA, manufactured by Seiko Instruments Inc.). As a measuring condition, the temperature was raised at 10° C./min.

For the chemical durability, the sample was held under a high temperature high humidity condition for a long time, and the chemical durability was evaluated by the change in transmittance as between before and after the holding. Specifically, a flat plate-shaped sample having a size of 15 mm×15 mm×10 mm having both surfaces of 15 mm×15 mm made to be mirror surfaces, was held at a temperature of 60° C. under a relative humidity of 90% for 336 hours, and the transmittances before and after the holding were measured by a spectrophotometer (trade name: U-3500, manufactured by Hitachi, Ltd.), whereupon it was calculated as the absolute value |Δ(%)| of change in transmittance Δ (%)=transmittance (after holding under the high temperature high humidity condition)−transmittance (before holding under the high temperature high humidity condition). The smaller the change in transmittance, the higher the chemical durability. In each of Examples 1 to 3, an average value of three times is shown, in each of Examples 4 to 7, an average value of two times is shown, in each of Examples 8 to 11, a value measured once is shown, and in each of Examples 12 and 13, an average value of two times is shown.

With respect to the melting property, etc. of glass, as a result of visual observation at the time of preparing a sample as described above, it was confirmed that in Examples 4 to 13, there was no problem with respect to the melting property, and the obtained glass samples were free from bubbles and stria.

TABLE 1

|  | Ex. 1 | Ex. 2 | Ex. 3 |
|---|---|---|---|
| $P_2O_5$ | 71.0 | 73.0 | 74.0 |
| $B_2O_3$ | 2.0 | 2.0 | 5.0 |
| $Al_2O_3$ | 14.0 | 11.0 | 12.0 |
| MgO | — | 2.0 | — |
| CaO | — | — | — |
| $LiO_2$ | — | — | — |
| $K_2O$ | 13.0 | 12.0 | 9.0 |
| Refractive index | 1.51 | 1.51 | 1.52 |
| Abbe number | 71.0 | 70.5 | 70.6 |
| Tg/° C. | — | — | — |
| Δ/% | 0.37 | 0.26 | 0.26 |

TABLE 2

|  | Ex. 4 | Ex. 5 | Ex. 6 | Ex. 7 | Ex. 8 |
|---|---|---|---|---|---|
| $P_2O_5$ | 77.0 | 77.4 | 77.5 | 77.4 | 77.0 |
| $B_2O_3$ | — | 3.5 | 2.3 | 4.7 | 4.6 |
| $Al_2O_3$ | 17.0 | 15.4 | 16.3 | 14.5 | 14.5 |
| MgO | — | — | — | — | — |
| CaO | 4.7 | 1.9 | 1.9 | 1.9 | 1.9 |
| $LiO_2$ | 1.2 | 1.8 | 2.0 | 1.5 | 2.0 |
| $K_2O$ | — | — | — | — | — |
| Refractive index | 1.53 | 1.53 | 1.53 | 1.53 | 1.53 |
| Abbe number | 69.8 | 70.4 | 69.8 | 70.8 | 70.5 |
| Tg/° C. | — | 562 | 554 | 575 | 535 |
| Δ/% | 0.01 | 0.00 | 0.00 | 0.01 | 0.01 |

TABLE 3

|  | Ex. 9 | Ex. 10 | Ex. 11 | Ex. 12 | Ex. 13 |
|---|---|---|---|---|---|
| $P_2O_5$ | 77.4 | 77.8 | 77.4 | 74.6 | 75.0 |
| $B_2O_3$ | 4.7 | 4.7 | 4.7 | 3.4 | 4.5 |
| $Al_2O_3$ | 15.0 | 15.0 | 15.0 | 14.8 | 14.1 |
| MgO | — | — | — | — | — |
| CaO | 0.9 | — | — | 1.8 | 1.8 |
| $LiO_2$ | 2.0 | 2.5 | 3.0 | — | — |
| $K_2O$ | — | — | — | 5.3 | 4.6 |
| Refractive index | 1.53 | 1.53 | 1.53 | 1.52 | 1.52 |
| Abbe number | 70.8 | 70.8 | 70.8 | 70.5 | 70.7 |
| Tg/° C. | 564 | 551 | 535 | 620 | 614 |
| Δ/% | 0.01 | 0.01 | 0.01 | 0.02 | 0.02 |

INDUSTRIAL APPLICABILITY

The phosphate optical glass of the present invention is an optical glass which has low dispersibility and a desired value of refractive index and which is excellent in chemical durability and yet is excellent in press moldability. Thus, it is useful as an optical glass for precision press molding.

The entire disclosure of Japanese Patent Application No. 2005-311293 filed on Oct. 26, 2005 including specification, claims and summary is incorporated herein by reference in its entirety.

What is claimed is:

1. A phosphate optical glass comprising, as glass components by mass %, from 1 to 4 mass % of $Li_2O$, 73 to 85 of $P_2O_5$, from 14 to 26 of $Al_2O_3$, from 1 to 12 of $K_2O+Li_2O$, from 0 to 12 of $SiO_2$, from 0 to 12 of $B_2O_3$, from 0 to 12 of $Na_2O$, from 0 to 12 of $Y_2O_3$, from 0 to 12 of $La_2O_3$, from 0 to 12 of $MgO+CaO+SrO+BaO$, from 0 to 10 of $ZrO_2+TiO_2+Gd_2O_3$, from 0 to 10 of $Ta_2O_5+GeO_2+Ga_2O_3+Nb_2O_5+WO_3+TeO_2$, from 0 to 2 of $Sb_2O_3$, and from 0 to 12 of $ZnO+PbO$ and which has a glass transition point (Tg) of at most 600° C.

2. The phosphate glass according to claim 1, which comprises, as glass components by mass %, from 74 to 80 of $P_2O_5$, from 15 to 25 of $Al_2O_3$ and from 1 to 8 of $K_2O+Li_2O$.

3. The phosphate glass according to claim 1, which has a refractive index ($n_d$) of from 1.45 to 1.65 and an Abbe number ($v_d$) of from 65 to 80.

4. The phosphate glass according to claim 1, which has refractive index ($n_d$) of from 1.50 to 1.55.

5. The phosphate glass according to claim 1, which has an Abbe number ($v_d$) of from 68 to 72.

* * * * *